United States Patent
Xu et al.

(10) Patent No.: US 8,836,228 B2
(45) Date of Patent: Sep. 16, 2014

(54) NON-ISOLATED RESONANT CONVERTER

(75) Inventors: Ming Xu, Nanjing (CN); Xinlei Li, Nanjing (CN)

(73) Assignees: FSP Technology Inc., Taoyuan County (TW); FSP-Powerland Technology Inc., Nanjing (CN)

( * ) Notice: Subject to any disclaimer, the term of this patent is extended or adjusted under 35 U.S.C. 154(b) by 364 days.

(21) Appl. No.: 13/468,017

(22) Filed: May 9, 2012

(65) Prior Publication Data

US 2012/0287678 A1 Nov. 15, 2012

(30) Foreign Application Priority Data

May 11, 2011 (CN) .......................... 2011 1 0120398

(51) Int. Cl.
*H05B 37/02* (2006.01)
*H02M 3/158* (2006.01)
*H02M 3/335* (2006.01)
*H02M 1/00* (2006.01)

(52) U.S. Cl.
CPC ...... *H02M 3/158* (2013.01); *H02M 2001/0058* (2013.01); *Y02B 70/1433* (2013.01); *H02M 3/33569* (2013.01)

USPC .......................................... 315/219; 363/21.02

(58) Field of Classification Search
USPC ......... 315/224, 244, 246, 276, 291, 307, 405; 363/16, 17, 21.02, 21.03, 21.12, 21.08
See application file for complete search history.

(56) References Cited

U.S. PATENT DOCUMENTS

| 4,184,197 | A | * | 1/1980 | Cuk et al. | .......................... 363/16 |
| 5,539,630 | A | * | 7/1996 | Pietkiewicz et al. | ............ 363/17 |
| 5,761,055 | A | * | 6/1998 | Okada et al. | ............... 363/56.08 |
| 6,049,177 | A | * | 4/2000 | Felper | ........................... 315/219 |
| 6,304,460 | B1 | * | 10/2001 | Cuk | ................................ 363/16 |

* cited by examiner

*Primary Examiner* — Rajnikant Patel
(74) *Attorney, Agent, or Firm* — Jianq Chyun IP Office

(57) ABSTRACT

A non-isolated resonant converter is provided. The provided non-isolated resonant converter includes a switch circuit, a resonant circuit and a rectifying-filtering circuit. The switch circuit, the resonant circuit and the rectifying-filtering circuit are sequentially connected. The resonant circuit includes an auto-transformer, a capacitor and an inductor, wherein the capacitor and the inductor are connected to the auto-transformer. The configuration of the provided non-isolated resonant converter has small size, low loss and high power density.

15 Claims, 10 Drawing Sheets

NON-ISOLATED RESONANT CONVERTER

CROSS-REFERENCE TO RELATED APPLICATION

This application claims the priority benefit of China application serial no. 201110120398.9, filed on May 11, 2011. The entirety of the above-mentioned patent application is hereby incorporated by reference herein and made a part of this specification.

BACKGROUND OF THE INVENTION

1. Field of the Invention

The present invention generally relates to a power conversion field, in particular, to a non-isolated resonant converter applied to photovoltaic inverters, LED constant-current driving and multi-path LED constant-current driving.

2. Description of Related Art

High frequency, high efficiency and high power density are the developing trends of switching power supply. By the characteristics of soft switching and great EMI performance, the resonant converter becomes important research issues in the power conversion technology field.

Most of the common resonant converter is formed based on the isolated transformer. Referring to FIG. 1 to FIG. 3, each of the resonant half-bridge converters respectively shown in FIGS. 1-3 is implemented by using the isolated transformer. The output of the resonant converters shown in FIG. 1 and FIG. 2 is implemented by using the full-wave rectification circuit, and the output of the resonant converter shown in FIG. 3 is implemented by using the half-wave double rectification circuit. To be specific, for FIG. 3, when the voltage of the common-polarity terminal (i.e. the dotted terminal) of the vice-side (secondary) winding of the isolated transformer is positive, the vice-side (secondary) winding of the isolated transformer supplies power to the load through a capacitor C and a diode D1 both connected with the vice-side winding of the isolated transformer, wherein the capacitor C has a function of voltage boosting. On the other hand, when the voltage of the common-polarity terminal of the vice-side winding of the isolated transformer is negative, the diode D1 is in the cut-off state, a diode D2 is in the conducting state, such that the capacitor C is charged at this time.

The duty cycle of a half-bridge switch circuit, which is constituted by two series-connected switch-transistors, is 50%, i.e., $T_{ON}=T_{OFF}$. Assuming that the average voltage of the two terminals of the capacitor C is $V_c$, so according to the voltage-second balance characteristic, it can be obtained the following equation:

$$(V_O-V_C) \times T_{ON} = V_C \times T_{OFF}.$$

Therefore, $$V_C = \frac{V_O}{2}.$$

Moreover, as shown in FIG. 14, a circuit diagram of an existing isolated resonant symmetric half-bridge converter is illustrated. A capacitor C141 and a capacitor C142 are connected in series. A switch-transistor Q1 and a switch-transistor Q2 are connected in series. A branch formed by the capacitors C141, C142 and a branch formed by the switch-transistors Q1, Q2 are connected in parallel and are both connected in parallel with the power (i.e. Vin). The negative electrode of the power (Vin) is grounded (or connected to a ground potential), and the parameters of the capacitors C141 and C142 are the same. The common-polarity input terminal (i.e. the dotted input terminal) of the isolated transformer is connected between the capacitors C141 and C142 (i.e., terminal 1); and the opposite-polarity input terminal (i.e. the non-dotted input terminal) of the isolated transformer is connected between the switch-transistors Q1 and Q2 (i.e., terminal 2) through the capacitor C143 and inductor L14. The vice-side winding of the isolated transformer is connected with a full-wave double synchronous rectifying (SR) circuit. The full-wave double synchronous rectifying circuit includes switch-transistor Q3, Q4 and capacitors C144, C145. The switch-transistors Q3 and Q4 are connected in series. The capacitors C144 and C145 are connected in series. A branch formed by the switch-transistors Q3, Q4 and a branch formed by the capacitors C144, C145 are connected in parallel, and two terminals of the parallel-connected branches are respectively served as a positive electrode and a negative electrode of the output of isolated resonant symmetric half-bridge converter. The common-polarity output terminal (i.e. the dotted output terminal) of the isolated transformer is connected between the capacitors C144 and C145. The opposite-polarity output terminal (i.e. the non-dotted output terminal) of the isolated transformer is connected between the switch-transistors Q3 and Q4. Based on the configuration of FIG. 14, the input of the isolated transformer is reduced due to the voltage difference between terminals 1 and 2 is $V_{in}/2$.

Since the isolated transformer is constituted by two independent windings, so the size and the loss of the resonant converter become larger and higher, which are important issues to be improved.

SUMMARY OF THE INVENTION

Accordingly, an auto-transformer is a transformer with only one winding. When the auto-transformer is used as a buck transformer, a part of turns in the winding is used as the secondary winding. When the auto-transformer is used as a boost transformer, the external voltage is only supplied to a part of turns in the winding. Therefore, the vice-side winding of the auto-transformer is a part of the primary-side winding thereof (for buck transformer), or the primary-side winding of the auto-transformer is a part of the vice-side winding thereof (for boost transformer). Hence, comparing the auto-transformer with the isolated transformer under the same capacity, copper wires applied in the auto-transformer are saved, so as to reduce the resistance loss of the winding and reduce the size of the auto-transformer. In addition, the aforementioned advantages of reducing the resistance loss of the winding and the size of the auto-transformer are emphasized in case that the auto-transformer has higher capacity and higher voltage.

Furthermore, the characteristic of using one winding of the auto-transformer makes that the auto-transformer has distinctive to the isolated transformer and cannot be replaced by the isolated transformer directly to form the resonant converter in real applications. Based on the considerations, the present invention is directed to a resonant converter with an auto-transformer (i.e. non-isolated resonant converter) in order to reduce the size and the power loss of the resonant converter.

In other words, the technical problems to be solved by the present invention are focused on the deficiencies of the aforementioned prior arts. The present invention provides a non-isolated resonant converter with small size, low loss and high power density.

An exemplary embodiment of the invention provides a non-isolated resonant converter. The non-isolated resonant converter includes a switch circuit, a resonant circuit and a rectifying-filtering circuit. The switch circuit, the resonant circuit and the rectifying-filtering circuit are sequentially connected. The resonant circuit includes an auto-transformer, a capacitor and an inductor, wherein the capacitor and the inductor are connected to the auto-transformer.

In an exemplary embodiment of the invention, the switch circuit includes two switch-transistors connected in series. The capacitor is a first capacitor and the inductor is a first inductor. The first capacitor and the first inductor are connected in series, a first terminal of the series-connected first capacitor and first inductor is connected between the two switch-transistors, a second terminal of the series-connected first capacitor and first inductor is connected to a first terminal of a winding of the auto-transformer, and a second terminal of the winding of the auto-transformer is connected to a ground potential. In this case, the rectifying-filtering circuit may include a second capacitor, a third capacitor, a first diode and a second diode. A first terminal of the second capacitor is connected to a third terminal of the winding of the auto-transformer, and a second terminal of the second capacitor is connected to an anode of the first diode and a cathode of the second diode. An anode of the second diode is connected to the second terminal of the winding of the auto-transformer and a first terminal of the third capacitor, and a second terminal of the third capacitor is connected to a cathode of the first diode. Alternatively, the rectifying-filtering circuit may include a second capacitor, a third capacitor, a first transistor and a second transistor. A first terminal of the second capacitor is connected to a third terminal of the winding of the auto-transformer, and a second terminal of the second capacitor is connected to a drain of the first transistor and a source of the second transistor. A drain of the second transistor is connected to the second terminal of the winding of the auto-transformer and a first terminal of the third capacitor, and a second terminal of the third capacitor is connected to a source of the first transistor.

In another exemplary embodiment of the invention, the switch circuit includes a first switch-transistor, a second switch-transistor, a third switch-transistor and a fourth switch-transistor. The first and the second switch-transistors are serially connected to form a first series branch, the third and the fourth switch-transistors are serially connected to form a second series branch, and the first and the second series branches are connected in parallel. The capacitor is a first capacitor, the inductor is a first inductor, and the resonant circuit further includes a second capacitor and a second inductor, wherein the first and the second inductors may be magnetically coupled or may not be magnetically coupled. Parameters of the first and the second capacitors are the same, and parameters of the first and the second inductors are the same. The first capacitor and the first inductor are connected in series, a first terminal of the series-connected first capacitor and first inductor is connected between the third and the fourth switch-transistors, and a second terminal of the series-connected first capacitor and first inductor is connected to a first terminal of a winding of the auto-transformer. The second capacitor and the second inductor are connected in series, a first terminal of the series-connected second capacitor and second inductor is connected between the first and the second switch-transistors, and a second terminal of the series-connected second capacitor and second inductor is connected to a second terminal of the winding of the auto-transformer. A third terminal of the winding of the auto-transformer is connected to a ground potential, and a number of turns between the first and the third terminals of the winding of the auto-transformer is the same as a number of turns between the second and the third terminals of the winding of the auto-transformer. In this case, the rectifying-filtering circuit may include a first diode, a second diode and a third capacitor. An anode of the first diode is connected to the first terminal of the winding of the auto-transformer, an anode of the second diode is connected to the second terminal of the winding of the auto-transformer, cathodes of the first and the second diodes are connected to a first terminal of the third capacitor, and a second terminal of the third capacitor is connected to the third terminal of the winding of the auto-transformer. Alternatively, the rectifying-filtering circuit may include a first transistor, a second transistor and a third capacitor. A drain of the first transistor is connected to the first terminal of the winding of the auto-transformer, a drain of the second transistor is connected to the second terminal of the winding of the auto-transformer, sources of the first and the second transistors are connected to a first terminal of the third capacitor, and a second terminal of the third capacitor is connected to the third terminal of the winding of the auto-transformer.

In another exemplary embodiment of the invention, the capacitor is a first capacitor and the inductor is a first inductor. The switch circuit includes a first switch-transistor, a second switch-transistor, a second capacitor and a third capacitor. The first and the second switch-transistors are serially connected to form a first series branch, the second and the third capacitors are serially connected to form a second series branch, and the first and the second series branches are connected in parallel. The first capacitor and the first inductor are connected in series, a first terminal of the series-connected first capacitor and first inductor is connected between the first and the second switch-transistors, a second terminal of the series-connected first capacitor and first inductor is connected to a first terminal of a winding of the auto-transformer, and a second terminal of the winding of the auto-transformer is connected between the second and the third capacitors. The non-isolated resonant converter further includes a fourth capacitor connected between a ground terminal of the switch circuit and a ground terminal of the rectifying-filtering circuit. In this case, the rectifying-filtering circuit may include a fifth capacitor, a sixth capacitor, a seventh capacitor, a first diode and a second diode. The fifth and the sixth capacitors are serially connected to form a first series branch, the first and the second diodes are forwardly and serially connected to form a second series branch, and the first branch, the second branch and the seventh capacitor are connected in parallel. The first terminal of the winding of the auto-transformer is further connected between the first and the second diodes, and the second terminal of the winding of the auto-transformer is further connected between the fifth and the sixth capacitors. Alternatively, the rectifying-filtering circuit may include a fifth capacitor, a sixth capacitor, a seventh capacitor, a first transistor and a second transistor. The fifth and the sixth capacitors are serially connected to form a first series branch, the first and the second transistors are serially connected to form a second series branch, and the first branch, the second branch and the seventh capacitor are connected in parallel. The first terminal of the winding of the auto-transformer is further connected between the first and the second transistors, and the second terminal of the winding of the auto-transformer is further connected between the fifth and the sixth capacitors.

In another exemplary embodiment of the invention, the switch circuit includes two switch-transistors connected in series. The capacitor is a first capacitor, the inductor is a first inductor, a first terminal of the first capacitor is connected between the two switch-transistors, a second terminal of the first capacitor is connected to a first terminal of a winding of the auto-transformer, and a second terminal of the winding of the auto-transformer is connected to a ground potential. A third terminal of the winding of the auto-transformer is connected to a first terminal of the first inductor. In this case, the rectifying-filtering circuit may include a second capacitor, a third capacitor, a first diode and a second diode. A first terminal of the second capacitor is connected to a second terminal of the first inductor, and a second terminal of the second capacitor is connected to an anode of the first diode and a cathode of the second diode. An anode of the second diode is connected to the second terminal of the winding of the auto-transformer and a first terminal of the third capacitor, and a second terminal of the third capacitor is connected to a cathode of the first diode.

From the above, in the present invention, the auto-transformer with small size and low loss is used to replace the isolated transformer to implement the resonant converter, and therefore, the loss of resonant converter is reduced and the power density of the resonant converter is increased.

In order to make the aforementioned and other features and advantages of the invention comprehensible, several exemplary implementations accompanied with figures are described in detail below.

DETAILED DESCRIPTION OF DISCLOSED EMBODIMENTS

Figure 1:
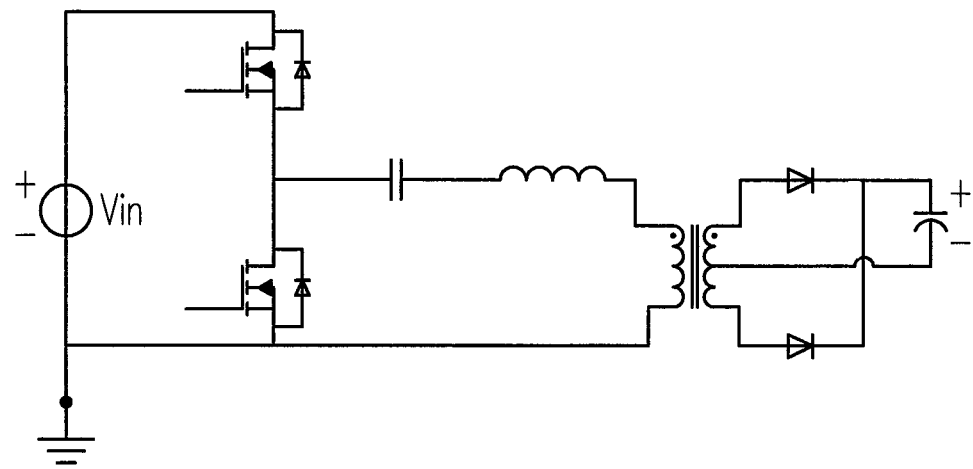
FIG. 1 is a schematic diagram illustrating a circuit configuration of an existing resonant half-bridge converter.
Figure 2:
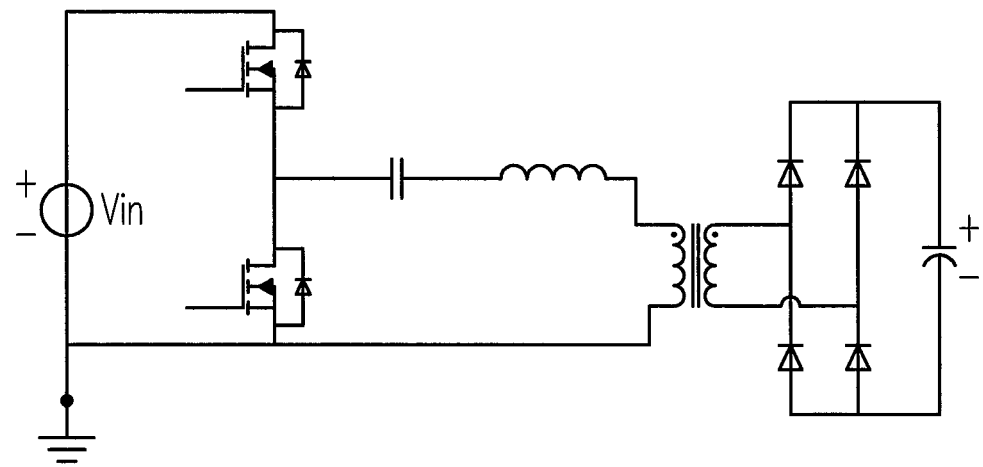
FIG. 2 is a schematic diagram illustrating a circuit configuration of another existing resonant half-bridge converter.
Figure 3:
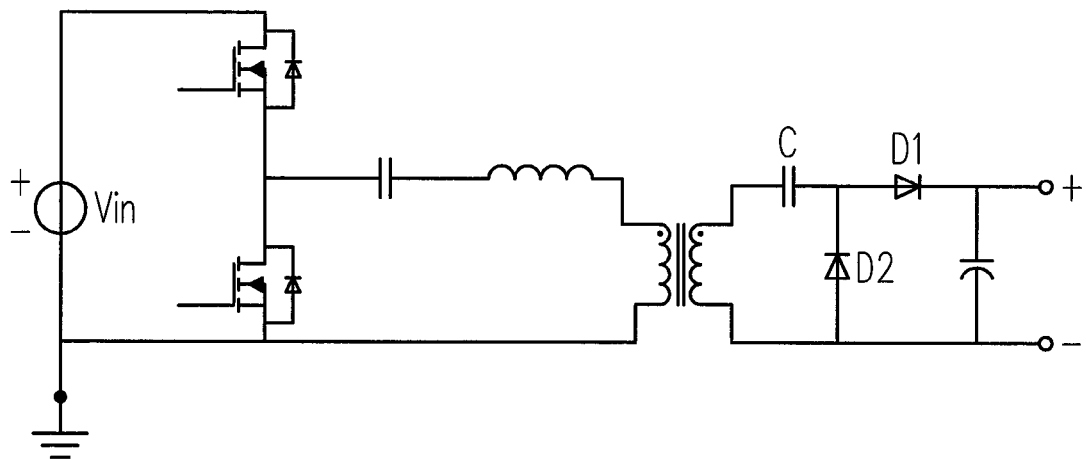
FIG. 3 is a schematic diagram illustrating a circuit configuration of yet another existing resonant half-bridge converter.

The exemplary embodiments of the disclosure are illustrated in detail below with reference to the accompanying drawings. In addition, components/members of the same reference numerals are used to represent the same or similar parts in the accompanying drawings and implementations wherever it is possible.

The structures and performances of the present invention will be described in detail with reference to the accompanying drawings.

Figure 21:
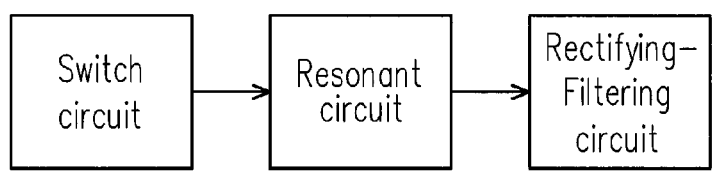
FIG. 21 is an overall architecture diagram of the present invention.

Referring to FIG. 21, the present invention provides a non-isolated resonant converter. The non-isolated resonant converter mainly includes three parts: a switch circuit, a resonant circuit and a rectifying-filtering circuit. The switch circuit, the resonant circuit and the rectifying-filtering circuit are sequentially connected. The resonant circuit includes an auto-transformer, a capacitor and an inductor, wherein the capacitor and the inductor are connected to the auto-transformer. It should be noted that the capacitor and the inductor included in the resonant circuit only represent the types of the elements rather than represent that the resonant circuit only includes one capacitor and one inductor, i.e., the resonant circuit may be connected with a plurality of capacitors and inductors, but the types of elements are just capacitors and inductors.

Figure 4:
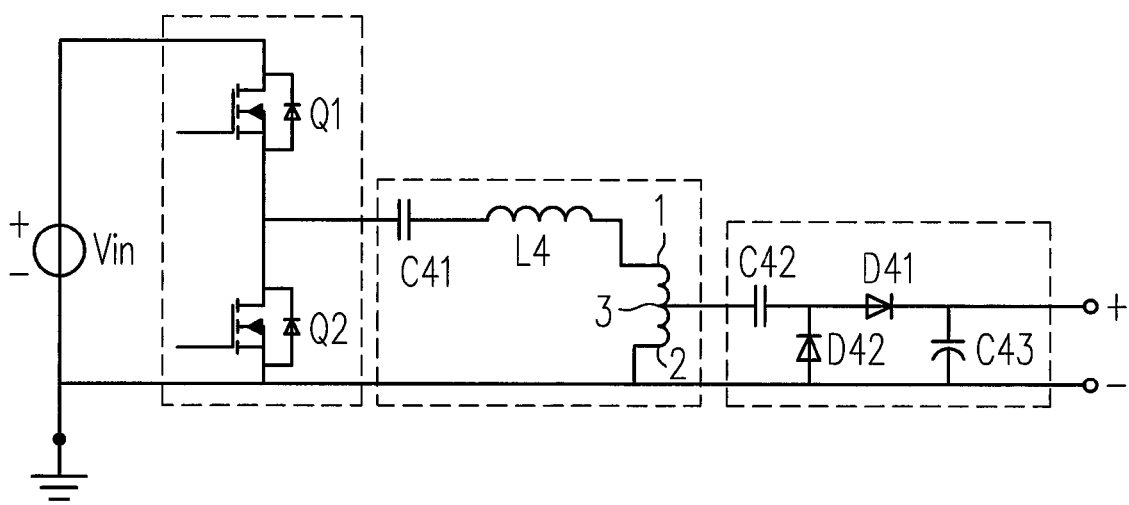
FIG. 4 is a schematic diagram of a circuit configuration of a first embodiment.

Referring to FIG. 4, which illustrates a first implementation configuration in the present invention. The three included parts can be respectively referred to the dotted blocks in FIG. 4. The switch circuit is implemented by two switch-transistors Q1, Q2 connected in series. The two series-connected switch-transistors Q1, Q2 are connected with two terminals of a power (i.e. Vin), wherein a negative electrode of the power (Vin) is grounded (or coupled to a ground potential).

The resonant circuit is implemented by a capacitor C41, an inductor L4 and an auto-transformer (i.e. LLC topology). A first terminal of the capacitor C41 is connected between the two series-connected switch transistors Q1, Q2 in the switch circuit, and a second terminal of the capacitor C41 is connected to a first terminal 1 of a winding of the auto-transformer through the inductor L4. A second terminal 2 of the winding of the auto-transformer is grounded (or connected to the ground potential). The rectifying-filtering circuit is implemented by a diode rectification circuit including capacitors C42, C43 and diodes D41, D42.

A first terminal of the capacitor C42 is connected to a third terminal 3 of the winding of the auto-transformer, and a second terminal of the capacitor C42 is connected to an anode of the diode D41, where the third terminal 3 of the winding of the auto-transformer is between the first and the second terminals 1, 2 of the winding of the auto-transformer. A cathode of the diode D41 is served as a positive electrode of the output of the non-isolated resonant converter. The second terminal of the capacitor C42 is further connected to a cathode of the diode D42. An anode of the diode D42 is connected to the second terminal 2 of the winding of the auto-transformer and a first terminal of the capacitor C43, wherein the first terminal of the capacitor C43 is served as a negative electrode of the output of the non-isolated resonant converter. A second terminal of the capacitor C43 is connected to the cathode of the diode D41.

Based on the aforementioned connection form relating to FIG. 4, this embodiment provides a resonant half-bridge converter, and the auto-transformer therewithin is designed as a buck auto-transformer. It should be noted that the rectifying-filtering circuit may also be implemented by a synchronous rectification circuit, such that the diodes D41 and D42 can be replaced by two transistors (i.e. the synchronous rectifiers (SRs)), wherein drain and source of each transistor (SR) are respectively corresponding to the anode and cathode of each diode, so the detail connections thereto will not be described herein.

Figure 5:
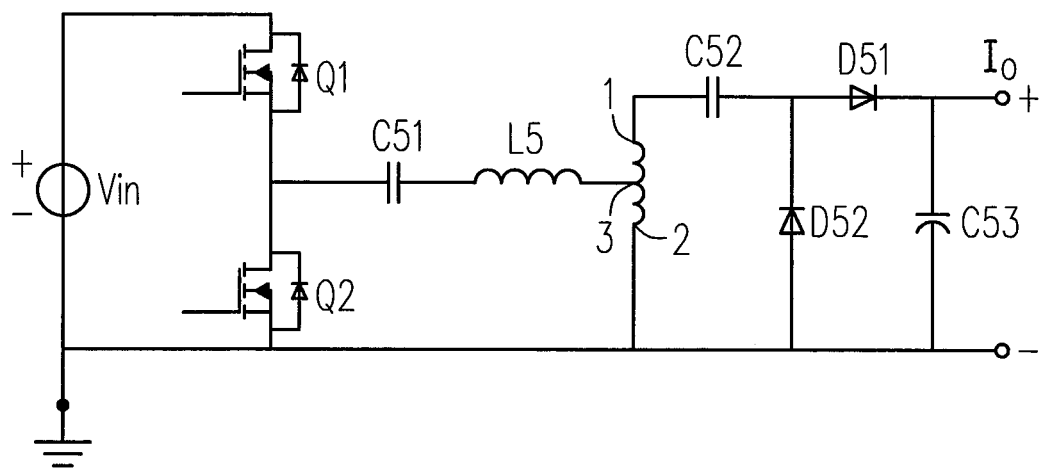
FIG. 5 is a schematic diagram of a circuit configuration of a second embodiment.

Referring to FIG. 5, which illustrates a second implementation configuration in the present invention. The resonant circuit is also implemented by the LLC topology. The difference between FIGS. 4 and 5 is that the auto-transformer shown in FIG. 5 is designed as a boost auto-transformer. In this case, a first terminal of the series-connected capacitor C51 and inductor L5 is connected between the two series-connected switch-transistors in the switch circuit, and a second terminal of the series-connected capacitor C51 and inductor L5 is connected the third terminal 3 of the boost auto-transformer. Moreover, the rectifying-filtering circuit (formed by capacitors C52, C53 and diodes D51, D52) is connected across the first and the second terminals 1, 2 of the boost auto-transformer, where the third terminal 3 of the winding of the boost auto-transformer is between the first and the second terminals 1, 2 of the winding of the boost auto-transformer.

Figure 6:
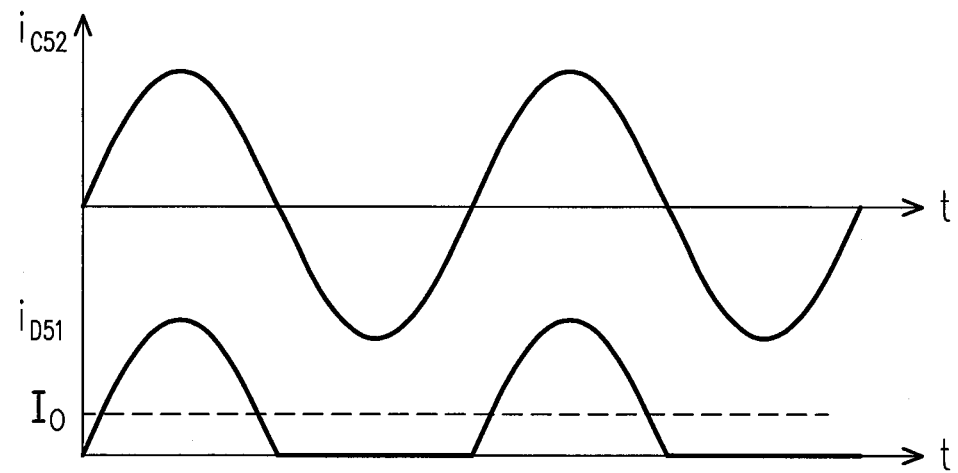
FIG. 6 is a current waveform of the second embodiment illustrated in FIG. 5.

In this embodiment, the current waveforms $i_{c52}$, $i_{D51}$ of the respective diode D51 and capacitor C52 of the rectifying-filtering circuit are as shown as in FIG. 6, wherein the average current value of the diode D51 is $I_O$, so the current stress of the diode D51 is larger. It should be noted that the diodes D51 and D52 can be similarly replaced by two transistors (SRs), wherein drain and source of each transistor (SR) are respectively corresponding to the anode and cathode of each diode, so the detail connections thereto will not be described herein.

Figure 7:
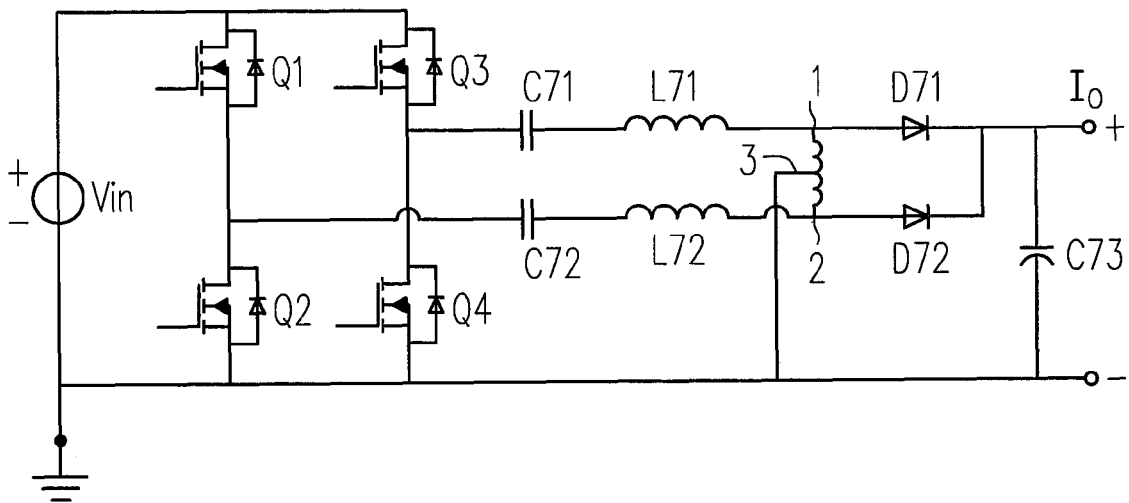
FIG. 7 is a schematic diagram of a circuit configuration of a third embodiment.

For the aforementioned configurations relating to FIGS. 4 and 5, the present invention further provides a third implementation configuration with reference to FIG. 7, which is a resonant full-bridge converter. The switch circuit includes four switch—transistors Q1 to Q4, which are divided into two groups each having two serially connected switch-transistors. The two groups are connected in parallel. In other words, the switch-transistors Q1 and Q2 are serially connected to form a first series branch, the switch-transistors Q3 and Q4 are serially connected to form a second series branch, and the first and the second series branches are connected in parallel.

The resonant circuit includes capacitors C71, C72 inductors L71, L72 and an auto-transformer designed as a buck auto-transformer. In this embodiment, the ratio of primary-side winding and the vice-side winding of the buck auto-transformer is 1:1, and a middle point (third terminal) 3 of the buck auto-transformer is grounded (or connected to the ground potential). That is, if the total number of turns of the buck auto-transformer is n, the number of turns between the terminals 1 and 3 is $n_{13}$, the number of turns between the terminals 2 and 3 is $n_{23}$, so $n_{13}=n_{23}=n/2$. In this case, the voltage ratio between the primary-side and the vice-side of the buck auto-transformer is 1:1, such that the current waveforms in the positive half-cycle and negative half-cycle are guaranteed to be the same.

The capacitor C71 and the inductor L71 are connected in series, wherein a first terminal of the series-connected capacitor C71 and inductor L71 is connected between the switch-transistors Q3 and Q4, and a second terminal of the series-connected capacitor C71 and inductor L71 is connected to the terminal 1 (first terminal) of the winding of the buck auto-transformer. In addition, the capacitor C72 and the inductor L72 are connected in series, a first terminal of the series-connected capacitor C72 and inductor L72 is connected between the switch-transistors Q1 and Q2, and a second terminal of the series-connected capacitor C72 and inductor L72 is connected to the terminal 2 (second terminal) of the winding of the buck auto-transformer.

In this embodiment, the parameters (i.e. capacitances) of the capacitors C71 and C72 are the same, and the parameters (i.e. inductances) of the inductors L71 and L72 are the same. The rectifying-filtering circuit includes diodes D71, D72 and a capacitor C73, which are connected to form a full-wave rectifying-filtering circuit. To be specific, an anode of the diode D71 is connected to the terminal 1 (first terminal) of the winding of the buck auto-transformer, an anode of the diode D72 is connected to the terminal 2 (second terminal) of the winding of the buck auto-transformer, cathodes of the diodes D71, D72 are connected to a first terminal of the capacitor C73, and a second terminal of the capacitor C73 is connected to the middle point 3 (third terminal) of the winding of the buck auto-transformer.

Figure 8:
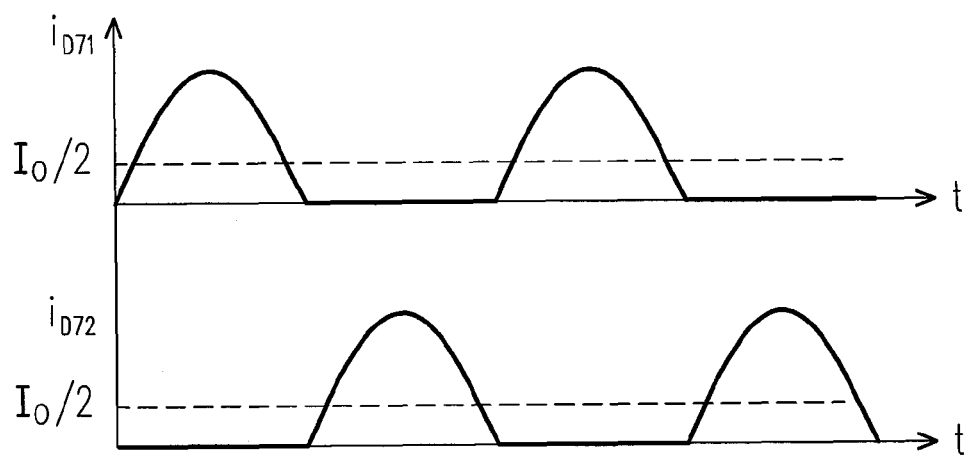
FIG. 8 is a current waveform of the third embodiment illustrated in FIG. 7.

In this embodiment, the current waveforms $i_{D71}$, $i_{D72}$ of the respective diodes D71 and D72 are illustrated in FIG. 8, wherein the average current values of both diodes D71 and D72 are half of the load current Io, namely, Io/2. It can be seen that this way of connections reduces the current stress of the elements comparing with the above embodiment relating to FIG. 5. It should be noted that, as the aforementioned descriptions, the diodes D71 and D72 of the rectifying-filtering circuit can be similarly replaced by transistors (SRs), wherein drain and source of each transistor (SR) are respectively corresponding to the anode and cathode of each diode, so the detail connections thereto will not be described herein.

Figure 9:
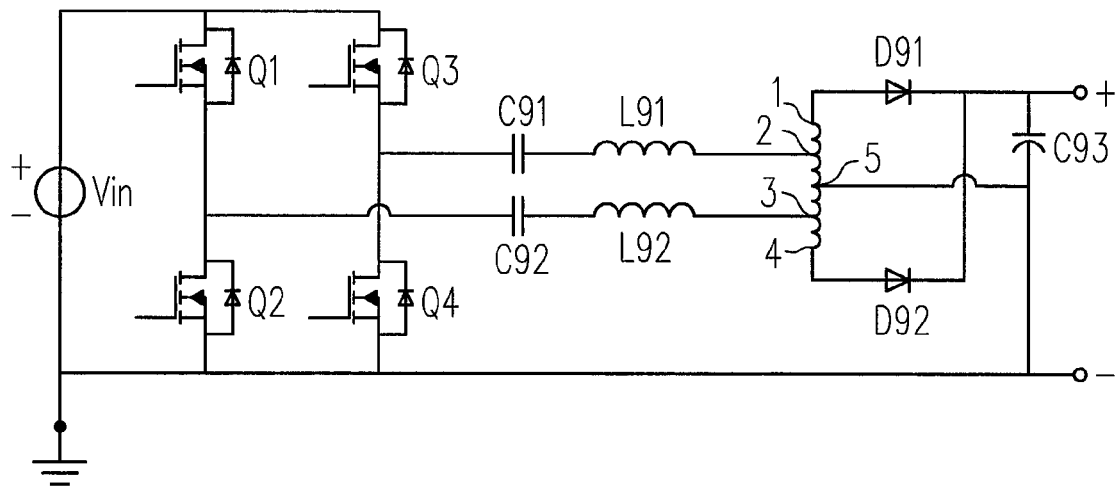
FIG. 9 is a schematic diagram of a circuit configuration of a fourth embodiment.

FIG. 9 illustrates a fourth implementation configuration in the present invention, which is also a resonant full-bridge converter. In this embodiment, the switch circuit is the same as that of FIG. 7, which is implemented by using four switch-transistors Q1 to Q4 divided into two groups each having two serially connected switch-transistors (Q1, Q2), (Q3, Q4), and the two groups are connected in parallel. Similarly, the switch-transistors Q1 and Q2 are serially connected to form a first series branch, the switch-transistors Q3 and Q4 are serially connected to form a second series branch, and the first and the second series branches are connected in parallel. The resonant circuit is implemented by capacitors C91, C92, inductors L91, L92 and an auto-transformer designed as a boost auto-transformer, where the parameters (i.e. capacitances) of the capacitors C91 and C92 are the same, and the parameters (i.e. inductances) of the inductors L91 and L92 are the same. The vice-side of the boost auto-transformer in the resonant circuit is connected with a full-wave rectifying-filtering circuit including diodes D91, D92 and a capacitor C93.

To be specific, a first terminal of the series-connected capacitor C91 and inductor L91 is connected between the switch-transistors Q3 and Q4, and a second terminal of the series-connected capacitor C91 and inductor L91 is connected to the terminal 2 of the winding of the boost auto-transformer. In addition, the capacitor C92 and the inductor L92 are connected in series, a first terminal of the series-connected capacitor C92 and inductor L92 is connected between the switch-transistors Q1 and Q2, and a second terminal of the series-connected capacitor C92 and inductor L92 is connected to the terminal 3 of the winding of the boost auto-transformer. An anode of the diode D91 is connected to the terminal 1 of the winding of the boost auto-transformer, an anode of the diode D92 is connected to the terminal 4 of the winding of the boost auto-transformer, cathodes of the diodes D91, D92 are connected to a first terminal of the capacitor C93, and a second terminal of the capacitor C93 is connected to the middle point 5 of the winding of the boost auto-transformer, where the middle point 5 of the winding of the boost auto-transformer is connected to the ground potential. In this embodiment, the terminal 2 is between the terminal 1 and the middle point 5; and the terminal 3 is between the terminal 4 and the middle point 5.

In this embodiment, if the total number of turns of the boost auto-transformer is n, the number of turns between the terminal 1 and the middle point 5 is $n_{15}$, the number of turns between the terminal 4 and the middle point 5 is $n_{45}$, so $n_{15}=n_{45}=n/2$. Moreover, the number of turns between the terminal 2 and the middle point 5 is $n_{25}$, the number of turns between the terminal 3 and the middle point 5 is $n_{35}$, so $n_{25}=n_{35}$, so as to guarantee that the current waveforms of the positive half-cycle and the negative half-cycle are the same. The voltage ratio between the vice-side and the primary-side of the boost auto-transformer is $n_{15}:n_{25}=n_{45}:n_{35}$, wherein $n_{25}$ is a part of $n_{15}$ and $n_{35}$ is a part of $n_{45}$. Therefore, the auto-transformer can achieve the purpose of voltage boosting conversion. It should be noted that the two diodes D91, D92 of the rectifying-filtering circuit can be respectively replaced by transistors (SRs) as in the previous embodiments, wherein drain and source of each transistor (SR) are respectively corresponding to the anode and cathode of each diode, so the detail connections thereto will not be described herein.

Figure 10:
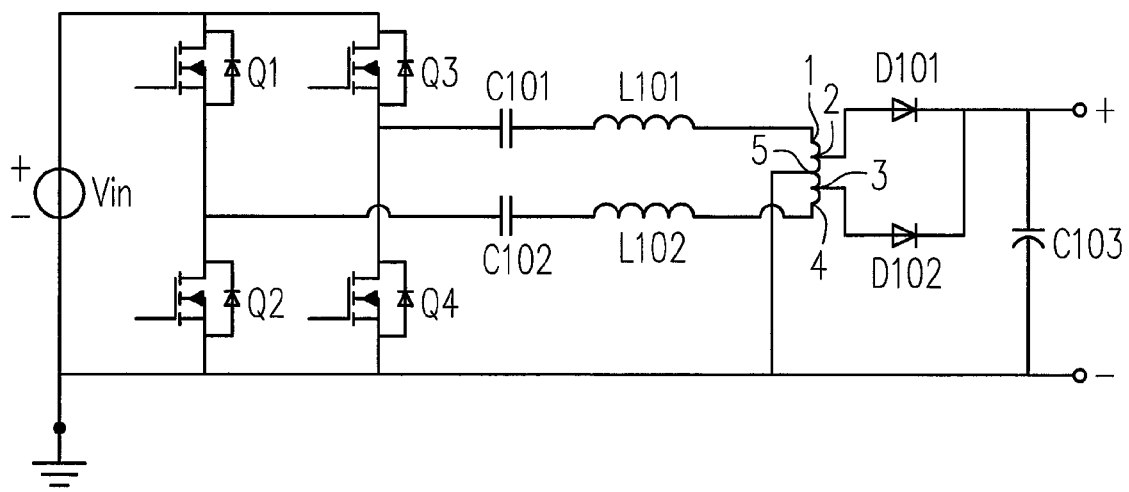
FIG. 10 is a schematic diagram of a circuit configuration of a fifth embodiment.

FIG. 10 illustrates a fifth implementation configuration in the present invention, which is also a resonant full-bridge converter. The difference between FIGS. 9 and 10 is that the auto-transformer as shown in FIG. 10 is designed as a buck auto-transformer. To be specific, a capacitor C101 and an inductor L101 are connected in series, a first terminal of the series-connected capacitor C101 and inductor L101 is connected between the switch-transistors Q3 and Q4, and a second terminal of the series-connected capacitor C101 and inductor L101 is connected to the terminal 1 of the winding of the buck auto-transformer.

In addition, the capacitor C102 and the inductor L102 are connected in series, a first terminal of the series-connected capacitor C102 and inductor L102 is connected between the switch-transistors Q1 and Q2, and a second terminal of the series-connected capacitor C102 and inductor L102 is connected to the terminal 4 of the winding of the buck auto-transformer. An anode of the diode D101 is connected to the terminal 2 of the winding of the buck auto-transformer, an anode of the diode D102 is connected to the terminal 3 of the winding of the buck auto-transformer, cathodes of the diodes D101, D102 are connected to a first terminal of the capacitor C103, and a second terminal of the capacitor C103 is connected to the middle point 5 of the winding of the buck auto-transformer, where the middle point 5 of the winding of the buck auto-transformer is connected to the ground potential. Similarly, the terminal 2 is between the terminal 1 and the middle point 5; and the terminal 3 is between the terminal 4 and the middle point 5. Moreover, the parameters (i.e. capacitances) of the capacitors C101 and C102 are the same, and the parameters (i.e. inductances) of the inductors L101 and L102 are the same.

In this embodiment, if the total number of turns of the buck auto-transformer is n, the number of turns between the terminal 1 and the middle point 5 is $n_{15}$, the number of turns between the terminal 4 and the middle point 5 is $n_{45}$, so $n_{15}=n_{45}=n/2$. Moreover, the number of turns between the terminal 2 and the middle point 5 is $n_{25}$, the number of turns between the terminal 3 and the middle point 5 is $n_{35}$, so $n_{25}=n_{35}$, so as to guarantee that the current waveforms of the positive half-cycle and the negative half-cycle are the same. The voltage ratio between the vice-side and the primary-side of the buck auto-transformer is $n_{15}:n_{25}=n_{45}:n_{35}$, wherein $n_{25}$ is a part of $n_{15}$ and $n_{35}$ is a part of $n_{45}$. Therefore, the buck auto-transformer can achieve the purpose of voltage bucking/conversion. It should be noted that the two diodes D101, D102 of the rectifying-filtering circuit can be respectively replaced by transistors (SRs) as in the previous embodiments, wherein drain and source of each transistor (SR) are respectively corresponding to the anode and cathode of each diode, so the detail connections thereto will not be described herein.

Figure 11:
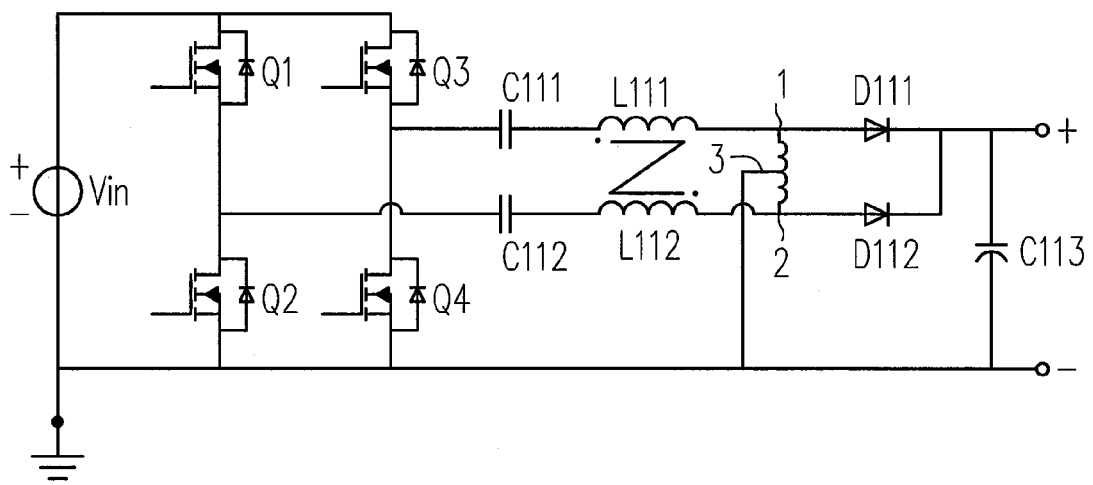
FIG. 11 is a schematic diagram of a circuit configuration of a sixth embodiment.

FIG. 11 illustrates a sixth implementation configuration in the present invention, which is also a resonant full-bridge converter. In this embodiment, the auto-transformer shown in FIG. 11 is designed as a buck auto-transformer. The vice-side of the buck auto-transformer is connected with the full-wave rectifying-filtering circuit including the diodes D111, D112 and the capacitor C113. The connections and the circuit configuration illustrated in FIG. 11 are the same as that of FIG. 7. However, the difference between FIGS. 7 and 11 is that inductors L111 and L112 are magnetically coupled, i.e., the inductors L111 and L112 are configured as a coupled inductor with the same parameter (inductance) at the primary-side and the vice-side of the buck auto-transformer. In this case, the common-polarity terminal (dotted terminal) of one side of the coupled inductor is connected with a capacitor C111, and the opposite-polarity terminal (non-dotted terminal) thereof is connected with the terminal 1 of the winding of the buck auto-transformer. On the other hand, the common-polarity terminal (dotted terminal) of the other side of the coupled inductor is connected with the terminal 2 of the winding of the buck auto-transformer, and the opposite-polarity terminal (non-dotted terminal) thereof is connected to a capacitor C112. The function of the coupled inductor is to guarantee that the current to ground of the middle point (terminal 3) is 0.

Figure 12:
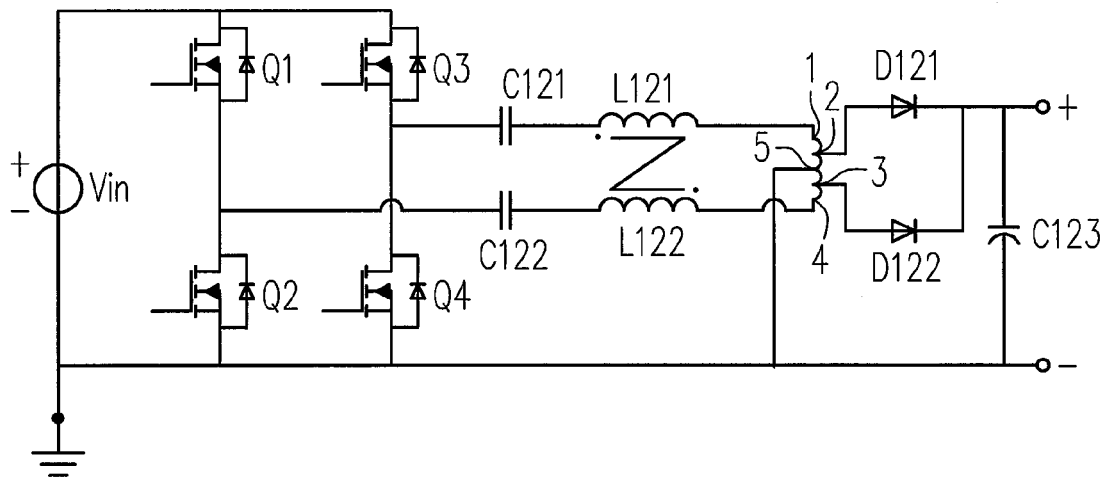
FIG. 12 is a schematic diagram of a circuit configuration of a seventh embodiment.

FIG. 12 illustrates a seventh implementation configuration in the present invention, which is also a resonant full-bridge converter. In this embodiment, the auto-transformer shown in FIG. 12 is designed as a buck auto-transformer. The vice-side of the buck auto-transformer is connected with the full-wave rectifying-filtering circuit including the diodes D121, D122 and the capacitor C123. The connections and the circuit configuration illustrated in FIG. 12 are the same as that of FIG. 10. However, the difference between FIGS. 10 and 12 is that in the resonant circuit, an inductor L121 is magnetically coupled with an inductor L122, i.e., the inductors L121 and L122 are configured as a coupled inductor with the same parameter (inductance) at the primary-side and the vice-side of the buck auto-transformer. In this case, the common-polarity terminal (dotted terminal) of one side of the coupled inductor is connected with a capacitor C121, and the opposite-polarity terminal (non-dotted terminal) thereof is connected with the terminal 1 of the winding of the buck auto-transformer. On the other hand, the common-polarity terminal (dotted terminal) of the other side of the coupled inductor is connected with the terminal 4 of the winding of the buck auto-transformer, and the opposite-polarity terminal (non-dotted terminal) thereof is connected with a capacitor C122. The function of the coupled inductor is to guarantee that the current to ground of the middle point (terminal) 5 is 0.

Figure 13:
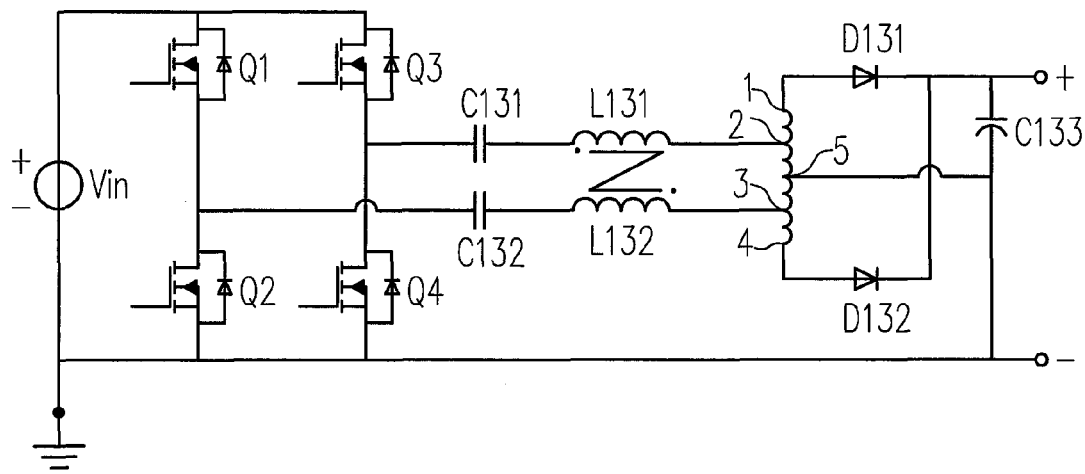
FIG. 13 is a schematic diagram of a circuit configuration of an eighth embodiment.
Figure 14:
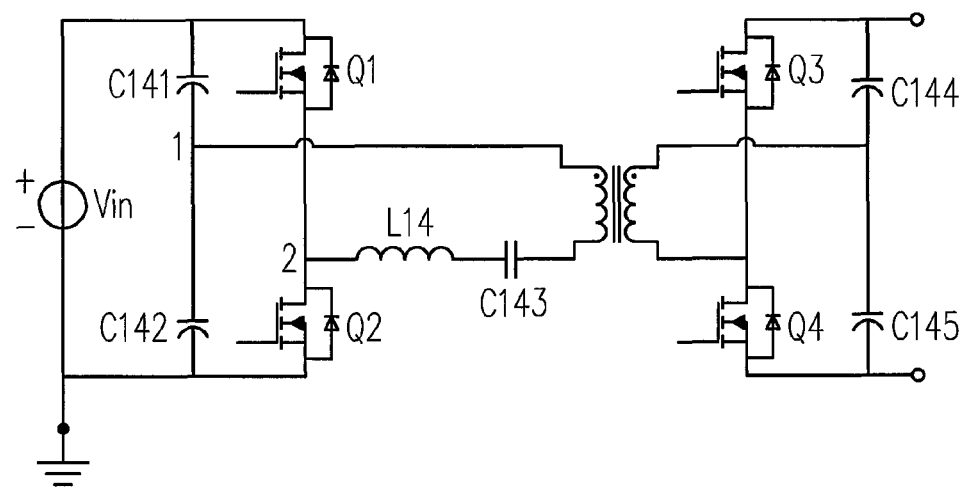
FIG. 14 a schematic diagram illustrating a circuit configuration of an existing resonant symmetric half-bridge converter.

FIG. 13 illustrates an eighth implementation configuration in the present invention, which is also a resonant full-bridge converter. In this embodiment, the auto-transformer is designed as a boost auto-transformer. The vice-side of the boost auto-transformer is connected with the full-wave rectifying-filtering circuit including the diodes D131, D132 and the capacitor C133. The connections and the circuit configuration illustrated in FIG. 13 are the same as that of FIG. 9.

However, the difference between FIGS. 9 and 13 is that in the resonant circuit, an inductor L131 is magnetically coupled to an inductor L132, i.e., the inductors L131 and L132 are configured as a coupled inductor with the same parameter (inductance) at the primary-side and the vice-side of the boost auto-transformer. In this case, the common-polarity terminal (dotted terminal) of one side of the coupled inductor is connected with a capacitor C131, and the opposite-polarity terminal (non-dotted terminal) thereof is connected with the terminal 2 of the winding of the boost auto-transformer. On the other hand, the common-polarity terminal (dotted terminal) of the other side of the coupled inductor is connected with the terminal 3 of the winding of the boost auto-transformer, and the opposite-polarity terminal (non-dotted terminal) thereof is connected to a capacitor C132. The function of the coupled inductor is to guarantee that the current to ground of the middle point (terminal) 5 is 0.

It should be noted that in the above embodiments relating to FIGS. 11 to 13, each rectifying-filtering circuit is implemented by using diodes to perform diode rectification, wherein the diodes can be replaced by transistors (SRs) to achieve the purpose of synchronous rectifying in order to apply in different working environments.

Figure 15:
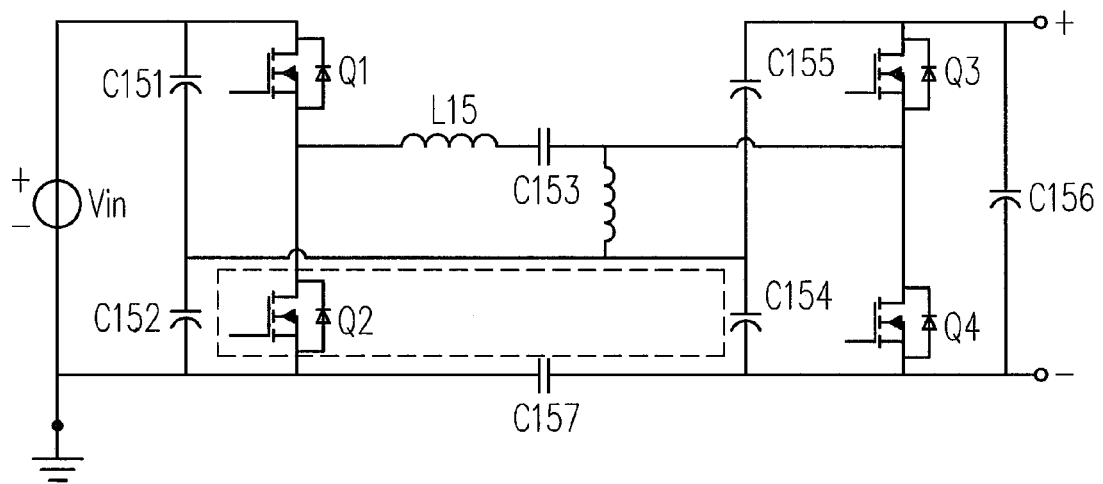
FIG. 15 is a schematic diagram of a circuit configuration of a ninth embodiment.

FIG. 15 illustrates a ninth implementation configuration in the present invention, which is a resonant symmetric half-bridge converter. In this embodiment, the switch circuit includes switch-transistors Q1, Q2 and capacitors C151, C152. The resonant circuit includes an inductor L15, a capacitor C153 and an auto-transformer. The rectifying-filtering circuit includes capacitors C154, C155, C156 and transistors (SRs) Q3, Q4. The switch-transistors Q1, Q2 are serially connected to form a first series branch, the capacitors C151, C152 are serially connected to form a second series branch, and the first and the second series branches are connected in parallel.

The capacitor C153 and the inductor L15 are connected in series, a first terminal of the series-connected capacitor C153 and inductor L15 is connected between the switch-transistors Q1 and Q2, a second terminal of the series-connected capacitor C153 and inductor L15 is connected to a first terminal of a winding of the auto-transformer, and a second terminal of the winding of the auto-transformer is connected between the capacitors C151 and C152.

The capacitors C154, C155 are serially connected to form a first series branch, the transistors Q3, Q4 are serially connected to form a second series branch, and the first branch, the second branch and the capacitor C156 are connected in parallel.

The first terminal of the winding of the auto-transformer is further connected between the transistors Q3 and Q4, and the second terminal of the winding of the auto-transformer is further connected between the capacitors C154 and C155.

In this embodiment, the ratio of the primary-side winding and the vice-side winding of the auto-transformer is 1:1, and the vice-side of the auto-transformer is connected with the full-wave double synchronous rectifying-filtering circuit. In addition, the auto-transformer has the characteristic of non-isolated, so the primary-side and the vice-side of the auto-transformer are grounded. In this case, the capacitors C152 and C154 are connected in parallel, and the voltage difference thereon would generate loop currents. Accordingly, in this embodiment, the resonant symmetric half-bridge converter may further include a capacitor C157 connected between a ground terminal of the switch circuit and a ground terminal of the rectifying-filtering circuit, so as to be served as a block capacitor for blocking DC component.

Figure 16:
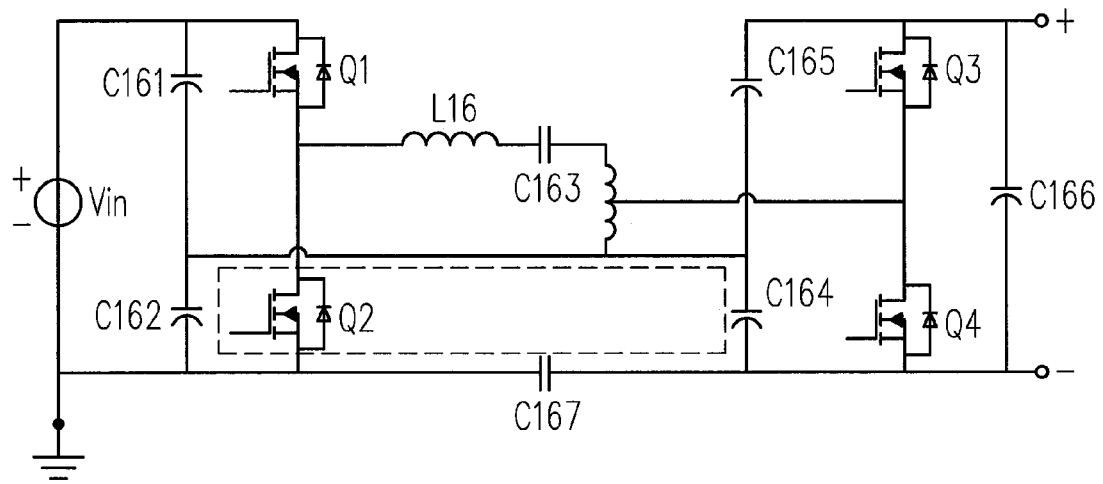
FIG. 16 is a schematic diagram of a circuit configuration of a tenth embodiment.

FIG. 16 illustrates a tenth implementation configuration in the present invention, which is also a resonant symmetric half-bridge converter. Similarly, in this embodiment, the switch circuit includes switch-transistors Q1, Q2 and capacitors C161, C162. The resonant circuit includes an inductor L16, a capacitor C163 and an auto-transformer. The rectifying-filtering circuit includes capacitors C164, C165, C166 and transistors (SRs) Q3, Q4. Moreover, the resonant symmetric half-bridge converter of FIG. 16 may further include a capacitor C167. The vice-side of the auto-transformer is similarly connected with the full-wave double synchronous rectifying-filtering circuit as FIG. 15. However, the difference between FIGS. 15 and 16 is that the auto-transformer shown in FIG. 16 is designed as a buck auto-transformer. The operation of FIG. 16 is substantially the same as that of FIG. 15, so the detail descriptions thereto will be omitted herein.

Figure 17:
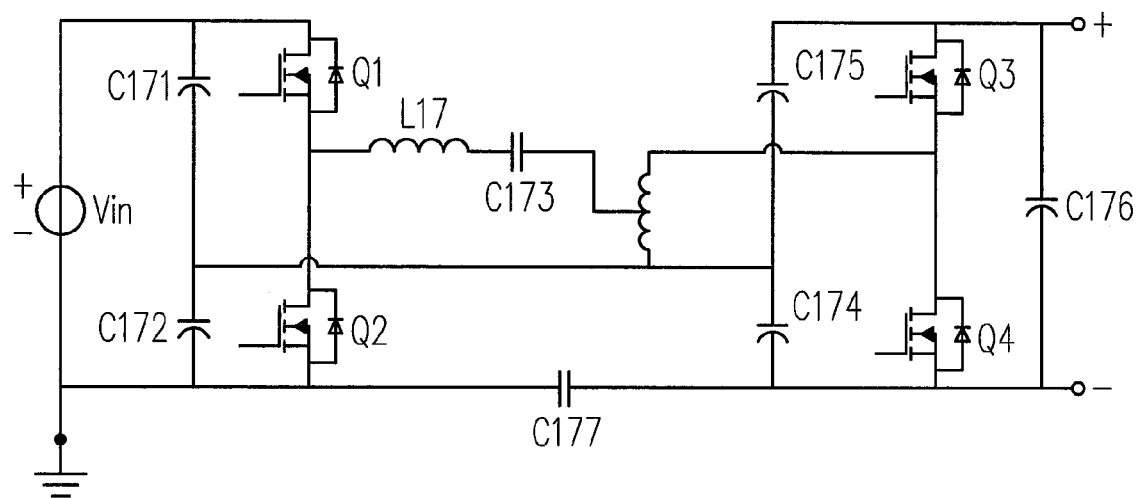
FIG. 17 is a schematic diagram of a circuit configuration of an eleventh embodiment.

FIG. 17 illustrates an eleventh implementation configuration in the present invention, which is also a resonant symmetric half-bridge converter. Similarly, in this embodiment, the switch circuit includes switch-transistors Q1, Q2 and capacitors C171, C172. The resonant circuit includes an inductor L17, a capacitor C173 and an auto-transformer. The rectifying-filtering circuit includes capacitors C174, C175, C176 and transistors (SRs) Q3, Q4. Moreover, the resonant symmetric half-bridge converter of FIG. 17 may further include a capacitor C177. The vice-side of the auto-transformer is similarly connected with the full-wave voltage doubling synchronous rectifying-filtering circuit as FIG. 16. However, the difference between FIGS. 16 and 17 is that the auto-transformer shown in FIG. 17 is designed as a boost auto-transformer. The operation of FIG. 17 is substantially the same as that of either FIG. 15 or 16, so the detail descriptions thereto will be omitted herein.

It should be noted that in the above embodiments relating to FIGS. 15-17, each rectifying-filtering circuit is implemented by using transistors (SRs) to perform synchronous rectification. However, in other embodiment, the transistors (SRs) can be replaced by diodes to perform diode rectification, wherein anode and cathode of each diode are respectively corresponding to the drain and the source of each transistor (SR), so the detail connections thereto will not be described herein.

Figure 18:
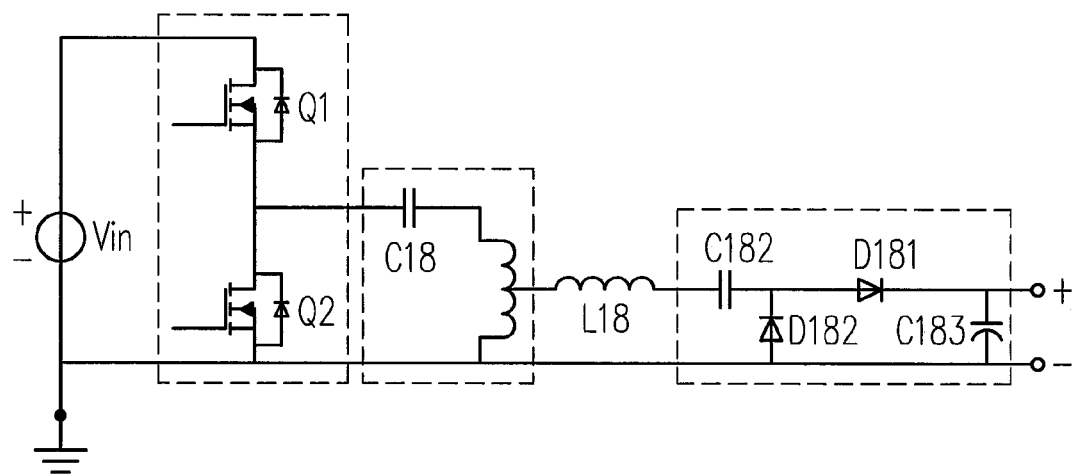
FIG. 18 is a schematic diagram of a circuit configuration of a twelfth embodiment.

FIG. 18 illustrates a twelfth implementation configuration in the present invention. In this embodiment, the switch circuit includes switch-transistors Q1 and Q2 connected in series. The resonant circuit includes a capacitor C18, an inductor L18 and an auto-transformer. The rectifying-filtering circuit includes capacitors C182, C183 and diodes D181, D182. A first terminal of the capacitor C18 is connected between the series-connected switch-transistors Q1 and Q2, a second terminal of the capacitor C18 is connected to a first terminal of a winding of the auto-transformer, and a second terminal of the winding of the auto-transformer is connected to a ground potential. A third terminal of the winding of the auto-transformer is connected to a first terminal of the first inductor, wherein the third terminal of the winding of the auto-transformer is between the first and the second terminals of the winding of the auto-transformer.

A first terminal of the capacitor C182 is connected to a second terminal of the inductor L18, and a second terminal of the capacitor C182 is connected to an anode of the diode D181 and a cathode of the diode D182. An anode of the diode D182 is connected to the second terminal of the winding of the auto-transformer and a first terminal of the capacitor C183, and a second terminal of the capacitor C183 is connected to a cathode of the diode D181.

In this embodiment, the difference between FIGS. 4 and 18 is that the capacitor C18 is connected with the primary-side of the auto-transformer, and the inductor L18 is connected with the vice-side of the auto-transformer. The rectifying-filtering circuit is connected across the inductor L18 and the vice-side of the auto-transformer.

Figure 19:
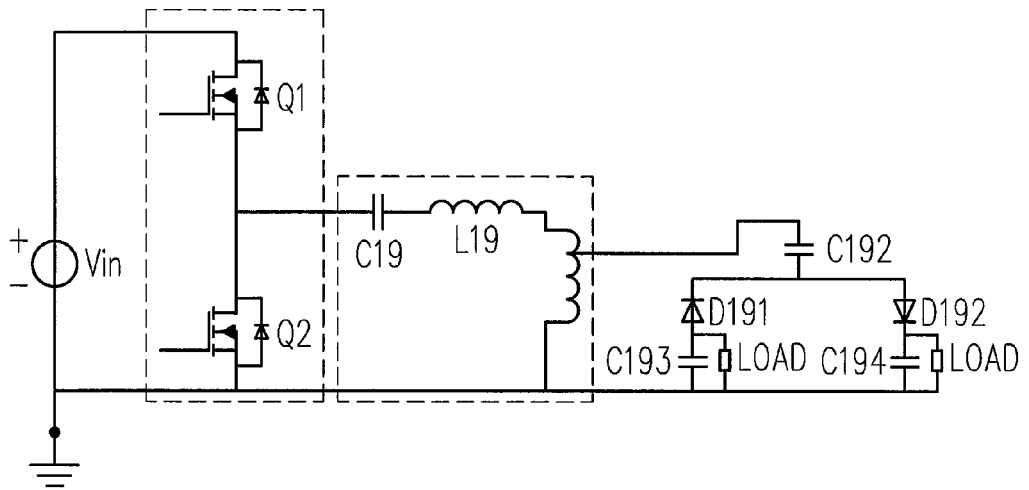
FIG. 19 is a schematic diagram of a circuit configuration of a thirteenth embodiment.

FIG. 19 illustrates a thirteenth implementation configuration in the present invention. In this embodiment, the switch circuit includes switch-transistors Q1 and Q2 connected in series. The resonant circuit includes a capacitor C19, an inductor L19 and an auto-transformer. The rectifying-filtering circuit includes capacitors C192, C193, C194 and diodes D191, D192. The capacitor C19 and the inductor L19 are connected in series, a first terminal of the series-connected capacitor C19 and inductor L19 is connected between the series-connected switch-transistors Q1 and Q2, and a second terminal of the series-connected capacitor C19 and inductor L19 is connected to a first terminal of a winding of the auto-transformer. A second terminal of the winding of the auto-transformer is connected to the ground potential. A first terminal of the capacitor C192 is connected to a third terminal of the winding of the auto-transformer, and a second terminal of the capacitor C192 is connected to a cathode of the diode D191 and an anode of the diode D192. An anode of the diode D191 is connected to the ground potential through the capacitor C193, and a cathode of the diode D192 is connected to the ground potential through the capacitor C194. Two loads LOAD are respectively connected in parallel with the corresponding capacitors C193 and C194.

In this embodiment, the difference between FIGS. 4 and 19 is that the vice-side of the auto-transformer shown in FIG. 19 is connected with the rectifying-filtering circuit capable of current balancing.

Figure 20:
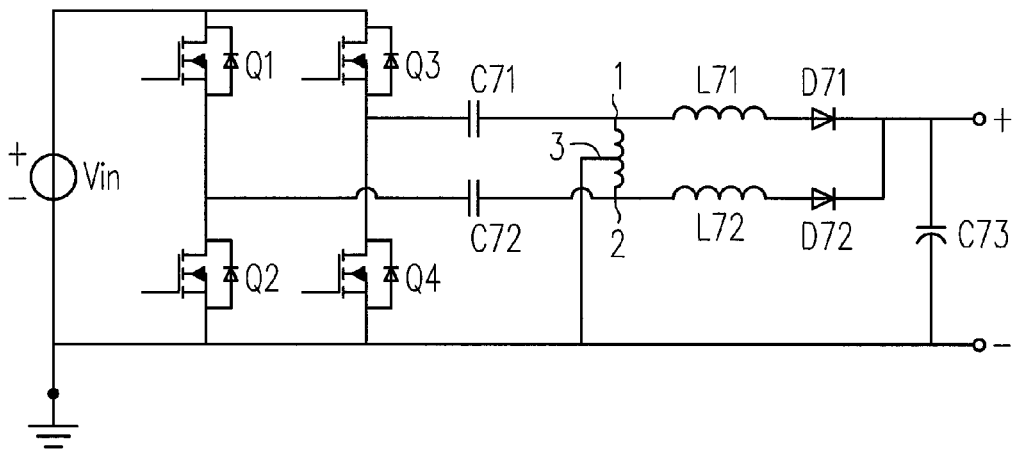
FIG. 20 is a schematic diagram of a circuit configuration of a fourteenth embodiment.

FIG. 20 illustrates a fourteenth implementation configuration in the present invention. In this embodiment, the components in the switch circuit, the resonant circuit and the rectifying-filtering circuit are the same as that of FIG. 7. However, the differences are as below. The first terminal of the capacitor C71 is connected between the series-connected switch-transistors Q3 and Q4, and the second terminal of the capacitor C71 is connected to the first terminal of the winding of the auto-transformer and the first terminal of the inductor L71. The first terminal of the capacitor C72 is connected between the series-connected switch-transistors Q1 and Q2, and the second terminal of the capacitor C72 is connected to the second terminal of the winding of the auto-transformer and the first terminal of the inductor L72. The third terminal of the winding of the auto-transformer is maintained to connect with the ground potential and the first terminal of the capacitor C73. The anode of the diode D71 is connected to the second terminal of the inductor L71, and the cathode of the diode D71 is maintained to connect with the second terminal of the capacitor C73. The anode of the diode D72 is connected to the second terminal of the inductor L72, and the cathode of the diode D72 is maintained to connect with the second terminal of the capacitor C73.

In this embodiment, the difference between FIGS. 7 and 20 is that the inductors L71 and L72 are connected to the vice-side of the auto-transformer, but the operations thereof are similarly to that of FIG. 7, so the detail descriptions thereof will be omitted herein.

It should be noted that the inductive elements in the embodiments described in the present invention are separately configured. However, in order to achieve minimization and integration of products in real manufactures, inductive elements will be integrated with auto-transformers, i.e., only auto-transformers and capacitive elements will be seen at the appearance. But substantially speaking, the inductive elements integrated with auto-transformers work independently and still have all of the working characteristics of inductors. Therefore, such modification embodiments should be still considered as a part of the concept of the "resonant circuit" provided in the present invention.

In summary, the present invention provides a non-isolated resonant converter, and the resonant circuit therewithin is mainly designed as a form of connecting auto-transformer, capacitor(s) and inductor(s). By the way of specially connecting auto-transformer, capacitor(s) and inductor(s), the auto-transformer can be really applied in the resonant converter(s). The advantages of small size and low loss of auto-transformer can be further utilized to increase product performance of resonant converter(s).

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A non-isolated resonant converter, comprising:
   a switch circuit;
   a resonant circuit; and
   a rectifying-filtering circuit,
   wherein the switch circuit, the resonant circuit and the rectifying-filtering circuit are sequentially connected, and
   the resonant circuit comprises:
   an auto-transformer;
   a capacitor; and
   an inductor, wherein the capacitor and the inductor are connected to the auto-transformer.

2. The non-isolated resonant converter as claimed in claim 1, wherein the switch circuit comprises two switch-transistors connected in series,
   wherein the capacitor is a first capacitor and the inductor is a first inductor,
   wherein the first capacitor and the first inductor are connected in series, a first terminal of the series-connected first capacitor and first inductor is connected between the two switch-transistors, a second terminal of the series-connected first capacitor and first inductor is connected to a first terminal of a winding of the auto-transformer, and a second terminal of the winding of the auto-transformer is connected to a ground potential.

3. The non-isolated resonant converter as claimed in claim 2, wherein the rectifying-filtering circuit comprises a second capacitor, a third capacitor, a first diode and a second diode,
   wherein a first terminal of the second capacitor is connected to a third terminal of the winding of the auto-transformer,
   wherein a second terminal of the second capacitor is connected to an anode of the first diode and a cathode of the second diode,
   wherein an anode of the second diode is connected to the second terminal of the winding of the auto-transformer and a first terminal of the third capacitor, and a second terminal of the third capacitor is connected to a cathode of the first diode.

4. The non-isolated resonant converter as claimed in claim 2, wherein the rectifying-filtering circuit comprises a second capacitor, a third capacitor, a first transistor and a second transistor,
wherein a first terminal of the second capacitor is connected to a third terminal of the winding of the auto-transformer,
wherein a second terminal of the second capacitor is connected to a drain of the first transistor and a source of the second transistor,
wherein a drain of the second transistor is connected to the second terminal of the winding of the auto-transformer and a first terminal of the third capacitor, and a second terminal of the third capacitor is connected to a source of the first transistor.

5. The non-isolated resonant converter as claimed in claim 1, wherein the switch circuit comprises a first switch-transistor, a second switch-transistor, a third switch-transistor and a fourth switch-transistor,
wherein the first and the second switch-transistors are serially connected to form a first series branch, the third and the fourth switch-transistors are serially connected to form a second series branch, and the first and the second series branches are connected in parallel,
wherein the capacitor is a first capacitor, the inductor is a first inductor, and the resonant circuit further comprises a second capacitor and a second inductor,
wherein parameters of the first and the second capacitors are the same, and parameters of the first and the second inductors are the same,
wherein the first capacitor and the first inductor are connected in series, a first terminal of the series-connected first capacitor and first inductor is connected between the third and the fourth switch-transistors, and a second terminal of the series-connected first capacitor and first inductor is connected to a first terminal of a winding of the auto-transformer,
wherein the second capacitor and the second inductor are connected in series, a first terminal of the series-connected second capacitor and second inductor is connected between the first and the second switch-transistors, and a second terminal of the series-connected second capacitor and second inductor is connected to a second terminal of the winding of the auto-transformer,
wherein a third terminal of the winding of the auto-transformer is connected to a ground potential, and a number of turns between the first and the third terminals of the winding of the auto-transformer is the same as a number of turns between the second and the third terminals of the winding of the auto-transformer.

6. The non-isolated resonant converter as claimed in claim 5, wherein the rectifying-filtering circuit comprises a first diode, a second diode and a third capacitor,
wherein an anode of the first diode is connected to the first terminal of the winding of the auto-transformer, an anode of the second diode is connected to the second terminal of the winding of the auto-transformer, cathodes of the first and the second diodes are connected to a first terminal of the third capacitor, and a second terminal of the third capacitor is connected to the third terminal of the winding of the auto-transformer.

7. The non-isolated resonant converter as claimed in claim 5, wherein the rectifying-filtering circuit comprises a first transistor, a second transistor and a third capacitor,
wherein a drain of the first transistor is connected to the first terminal of the winding of the auto-transformer, a drain of the second transistor is connected to the second terminal of the winding of the auto-transformer, sources of the first and the second transistors are connected to a first terminal of the third capacitor, and a second terminal of the third capacitor is connected to the third terminal of the winding of the auto-transformer.

8. The non-isolated resonant converter as claimed in claim 5, wherein the first and the second inductors are magnetically coupled.

9. The non-isolated resonant converter as claimed in claim 8, wherein the rectifying-filtering circuit comprises a first diode, a second diode and a third capacitor,
wherein an anode of the first diode is connected to the first terminal of the winding of the auto-transformer, an anode of the second diode is connected to the second terminal of the winding of the auto-transformer, cathodes of the first and the second diodes are connected to a first terminal of the third capacitor, and a second terminal of the third capacitor is connected to the third terminal of the winding of the auto-transformer.

10. The non-isolated resonant converter as claimed in claim 8, wherein the rectifying-filtering circuit comprises a first transistor, a second transistor and a third capacitor,
wherein a drain of the first transistor is connected to the first terminal of the winding of the auto-transformer, a drain of the second transistor is connected to the second terminal of the winding of the auto-transformer, sources of the first and the second transistors are connected to a first terminal of the third capacitor, and a second terminal of the third capacitor is connected to the third terminal of the winding of the auto-transformer.

11. The non-isolated resonant converter as claimed in claim 1, wherein the capacitor is a first capacitor and the inductor is a first inductor,
wherein the switch circuit comprises a first switch-transistor, a second switch-transistor, a second capacitor and a third capacitor,
wherein the first and the second switch-transistors are serially connected to form a first series branch, the second and the third capacitors are serially connected to form a second series branch, and the first and the second series branches are connected in parallel,
wherein the first capacitor and the first inductor are connected in series, a first terminal of the series-connected first capacitor and first inductor is connected between the first and the second switch-transistors, a second terminal of the series-connected first capacitor and first inductor is connected to a first terminal of a winding of the auto-transformer, and a second terminal of the winding of the auto-transformer is connected between the second and the third capacitors,
wherein the non-isolated resonant converter further comprises a fourth capacitor connected between a ground terminal of the switch circuit and a ground terminal of the rectifying-filtering circuit.

12. The non-isolated resonant converter as claimed in claim 11, wherein the rectifying-filtering circuit comprises a fifth capacitor, a sixth capacitor, a seventh capacitor, a first diode and a second diode,
wherein the fifth and the sixth capacitors are serially connected to form a first series branch, the first and the second diodes are forwardly and serially connected to form a second series branch, and the first branch, the second branch and the seventh capacitor are connected in parallel, wherein the first terminal of the winding of the auto-transformer is further connected between the first and the second diodes, and the second terminal of the winding of the auto-transformer is further connected between the fifth and the sixth capacitors.

13. The non-isolated resonant converter as claimed in claim 11, wherein the rectifying-filtering circuit comprises a fifth capacitor, a sixth capacitor, a seventh capacitor, a first transistor and a second transistor, wherein the fifth and the sixth capacitors are serially connected to form a first series branch, the first and the second transistors are serially connected to form a second series branch, and the first branch, the second branch and the seventh capacitor are connected in parallel, wherein the first terminal of the winding of the auto-transformer is further connected between the first and the second transistors, and the second terminal of the winding of the auto-transformer is further connected between the fifth and the sixth capacitors.

14. The non-isolated resonant converter as claimed in claim 1, wherein the switch circuit comprises two switch-transistors connected in series, wherein the capacitor is a first capacitor, the inductor is a first inductor, a first terminal of the first capacitor is connected between the two switch-transistors, a second terminal of the first capacitor is connected to a first terminal of a winding of the auto-transformer, and a second terminal of the winding of the auto-transformer is connected to a ground potential, wherein a third terminal of the winding of the auto-transformer is connected to a first terminal of the first inductor.

15. The non-isolated resonant converter as claimed in claim 14, wherein the rectifying-filtering circuit comprises a second capacitor, a third capacitor, a first diode and a second diode, wherein a first terminal of the second capacitor is connected to a second terminal of the first inductor, and a second terminal of the second capacitor is connected to an anode of the first diode and a cathode of the second diode, wherein an anode of the second diode is connected to the second terminal of the winding of the auto-transformer and a first terminal of the third capacitor, and a second terminal of the third capacitor is connected to a cathode of the first diode.

\* \* \* \* \*